United States Patent
Lamarca et al.

(10) Patent No.: US 9,588,581 B2
(45) Date of Patent: Mar. 7, 2017

(54) COMPOSABLE THIN COMPUTING DEVICE

(71) Applicant: Intel Corporation, Santa Clara, CA (US)

(72) Inventors: Anthony G. Lamarca, Seattle, WA (US); Omesh Tickoo, Portland, OR (US); Maynard C. Falconer, Portland, OR (US); Shilpa Talwar, Santa Clara, CA (US); Wen-Ling M. Huang, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 14/022,868

(22) Filed: Sep. 10, 2013

(65) Prior Publication Data

US 2015/0070833 A1  Mar. 12, 2015

(51) Int. Cl.
*G06F 1/16* (2006.01)
*G06F 3/01* (2006.01)
*H04M 1/02* (2006.01)

(52) U.S. Cl.
CPC .............. *G06F 3/011* (2013.01); *G06F 1/163* (2013.01); *G06F 1/1635* (2013.01); *G06F 1/1698* (2013.01); *H04M 1/0256* (2013.01)

(58) Field of Classification Search
CPC ........ G06F 3/011; G06F 1/163; G06F 1/1684; G06F 1/1698
See application file for complete search history.

(56) References Cited

U.S. PATENT DOCUMENTS

| | | | | |
|---|---|---|---|---|
| 2008/0195980 A1* | 8/2008 | Morris | .................. | G06F 3/0481 715/864 |
| 2011/0004327 A1* | 1/2011 | Bonnat | ................... | G06F 3/011 700/83 |
| 2012/0059780 A1* | 3/2012 | Kononen | .......... | H04M 1/72522 706/14 |
| 2012/0083705 A1* | 4/2012 | Yuen | .................... | A61B 5/0002 600/508 |
| 2012/0293630 A1* | 11/2012 | Persaud | .................. | A63F 13/06 348/47 |
| 2013/0038792 A1* | 2/2013 | Quigley | ................. | A61H 19/00 348/515 |
| 2015/0043770 A1* | 2/2015 | Chen | .................. | G06K 9/00208 382/103 |
| 2015/0253847 A1* | 9/2015 | Harris | ..................... | G06F 3/017 345/156 |

* cited by examiner

*Primary Examiner* — Anthony Q Edwards
(74) *Attorney, Agent, or Firm* — Grossman, Tucker, Perreault & Pfleger, PLLC (57) ABSTRACT

This disclosure is directed to a composable thin computing device. An example device may comprise at least a device interface module, a communication module, a processing module, a memory module, a composable computing module and a power module. The device interface module may couple the device to an operational environment via at least one of a physical connector or a wireless connection. The communication module may at least one of transmit or receive data via the device interface module. The processing module may process the data. The memory module may store at least a portion of the data. The composable computing module may cause at least one of the above modules to perform certain functionality related to the operational environment. The power module may power at least one of the above modules.

10 Claims, 4 Drawing Sheets

COMPOSABLE THIN COMPUTING DEVICE

TECHNICAL FIELD

The present disclosure relates to a computing device, and more particularly, to a device that may have limited resources but is still composable for operating in a variety of applications.

BACKGROUND

Modern communication architectures are currently experiencing substantial evolution due to the growing availability of powerful communication devices. Smart phones, tablet computers, laptop computers, etc. grant users great access to data on an on-demand basis. Far surpassing the ability to simply conduct voice interactions, devices now allow a user to communicate via email, messaging, social networking and other Internet-based interactions. Moreover, content that was typically only available at certain times and in certain locations such as, for example, television programming, movies, video games, electronic books, etc. is now available whenever a user has access to a network. The ability to access data in virtually any place at any time has created the notion of online presence. Online presence may pertain to this ability for constant access. Since new events are constantly occurring (e.g., news, content publishing, social media updates, etc.) and online access regarding these event is available immediately, for users to be truly connected their online presence must be persistently connected and updated in a readily accessible manner.

Online presence being persistently connected and updated in a readily accessible manner may depend heavily on user equipment. Many users currently rely on smart phones to maintain online presence. Smart phones may be persistently connected and may provide immediate user access. However, to satisfy the user demand for higher quality user experience, emerging smart phones have increasingly more powerful processors, larger displays, etc. While the benefits of this evolution are apparent, some negative consequences of providing these features may include increased device size, complexity, cost, power consumption and vulnerability. As a result, there are some situations where using a smart phone to maintain online presence may be difficult or impossible due to the size of the device, the unmanageable power consumption involved in being persistently connected, the potential cost (e.g., both financial and in compromised personal data) if the device becomes damaged, stolen, etc., making the device not readily accessible to the user.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to a composable thin computing device. A device consistent with the present disclosure may be both "composable" and "thin." Initially, a composable device may be combined with an operational environment (e.g., a predetermined situation including at least one other device to provide cooperative computing functionality with the composable device) to perform certain functionality related to the operational environment. For example, combining a composable device with an operational environment including at least a television (TV) monitor may cause the composable device to perform TV-related functionality comprising, for example, enabling typical TV-related remote control features, causing content to be presented such as TV programs, movies, video games, etc. As referenced herein, "thin" may encompass computing devices that may not be fully operational without external equipment. For example, a thin device may include all required computing features for the thin device to process data with the exception of user interface equipment (e.g., a monitor, keyboard, mouse, etc.). The thin device may rely upon another device, group of devices, etc. to provide the missing features.

In one embodiment a device may comprise, for example, a device interface module, a communication module, a processing module, a memory module, a composable computing module and a power module. The device interface module may be to couple the device to an operational environment via at least one of a physical connector or a wireless connection. The communication module may be to at least one of transmit or receive data via the device interface module. The processing module may be to process the data. The memory module may be to store at least a portion of the data. The composable computing module may be to cause at least one of the communication module, the processing module or the memory module to perform certain functionality related to the operational environment. The power module may be to power at least one of the communication module, processing module, memory module, composable computing module or device interface module.

In one example implementation consistent with the present disclosure, the operational environment may be a predetermined situation to provide cooperative computing functionality with the device. The size of the device in entirety may, for example, not substantially exceed the size of the physical connector. The power module may further be to utilize the device interface module to recharge at least one battery in the power module. The composable computing module may further be to identify the operational environment to which the device is coupled. The composable computing module may further be to determine the certain functionality based on the identification of the operational environment. The operational environment may comprise at least one other device including a user interface module to allow for user interaction with the other device. The composable computing module may further be to cause a user interface based on the certain functionality to be presented by the user interface module and cause actions related to the certain functionality to be performed based on the user interaction.

In the same or a different embodiment, the composable computing module may further be to determine when the device is not coupled to the operational environment and cause the device to wirelessly couple to a remote resource via the device interface module when it is determined that the device is not coupled to the operational environment. The composable computing module may further be to cause interaction between the device and the remote resource related to the certain functionality. The device may further comprise at least one sensor to provide sensor data to the composable computing module for controlling the interaction with the remote resource. An example method consistent with the present disclosure may comprise determining a state change in a device, determining based on the state change if the device is coupled to an operational environment, if it is determined that the device is coupled to the operational environment, identifying the operational environment and causing a user interface based on certain functionality related to the operational environment to be presented by the operational environment, and if it is determined that the device is not coupled to the operational environment, causing the device to interact with a remote resource.

Figure 1:
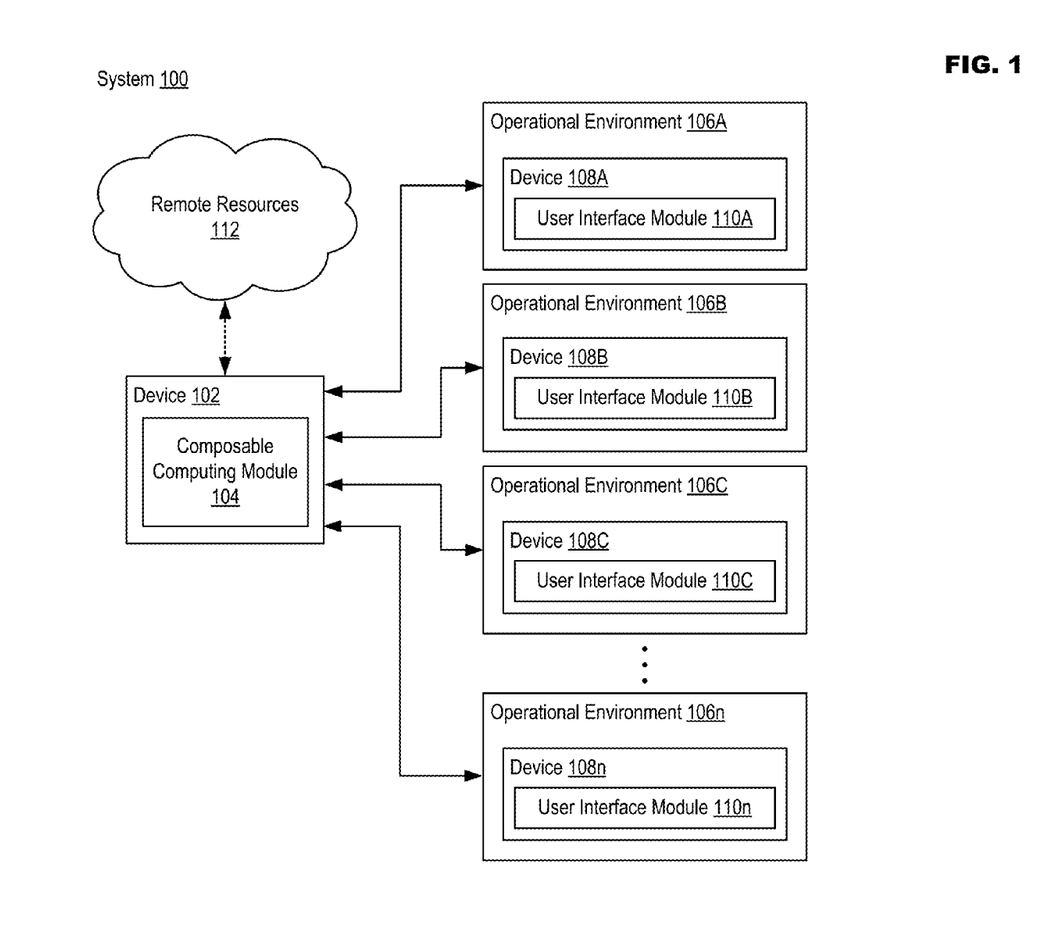
FIG. 1 illustrates an example system including a composable thin computing device in accordance with at least one embodiment of the present disclosure.

FIG. 1 illustrates an example system including a composable thin computing device in accordance with at least one embodiment of the present disclosure. System 100 may comprise, for example, at least one device 102, operational environment 106A, operational environment 106B, operational environment 106C . . . operational environment 106n (collectively, operational environments 106A . . . n) and remote resources 112. In one embodiment, device 102 may be very small in that it may be carried by, worn by or even implanted within a user. The user may couple device 102 to operational environments 106A . . . n whenever the user desires to access certain functionality. In one embodiment, device 102 may include composable computing module 104 for causing device 102 to perform the certain functionality when device 102 is combined with operational environments 106A . . . n. For example, when device 102 interacts with operational environments 106A . . . n, composable computing module 104 may identify the particular operational environment 106A . . . n and may then determine the certain functionality to perform.

Operational environments 106A . . . n are systems with which device 102 may be combined to perform certain functionality. Operational environments 106A . . . n may each comprise at least one device 108A, device 108B, device 108C . . . device 108n, respectively (collectively, devices 108A . . . n), to interact with device 102. Examples of devices 108A . . . n may include, but are not limited to, mobile communication devices such as a cellular handset or a smartphone based on the Android® operating system (OS), iOS®, Windows® OS, Blackberry® OS, Palm® OS, Symbian® OS, etc., mobile computing devices such as a tablet computer like an iPad®, Surface®, Galaxy Tab®, Kindle Fire®, etc., Ultrabooks® including a low-power chipset manufactured by Intel Corporation, netbooks, notebooks, laptops, palmtops, etc., stationary computing devices such as desktop computers, set-top devices, smart televisions (TV), etc.

The certain functionality to be performed may depend on the context of operational environments 106A . . . n. For example, if operational environment 106A is the home of the user, and device 108A is a TV, then an example of certain functionality to be performed when device 102 is coupled to operational environment 106A may involve presenting various content on the TV (e.g., TV programs, movies, games, etc.). In one embodiment, devices 108A . . . n may each include user interface module 110A, user interface module 110B, user interface module 110C . . . user interface module 110n, respectively (collectively, user interface modules 110A . . . n). User interface modules 110A . . . n may include circuitry configured to allow users to interact with devices 108A . . . n such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). During coupling, composable computing module 104 may cause user interface modules 110A . . . n to present a user interface (e.g., to display information, generate sound, etc.) based on the certain functionality, and may then cause actions related to the certain functionality to be performed based on user interaction with the user interface. Continuing with the above example of home operational environment 106A, device 102 may cause user interface module 110A to list content stored on device 102 that may be presented using TV 108A. The user may then select content from the listing, which may cause the content to be presented on TV 108A.

Remote resources 112 may include at least one computing device accessible via wired and/or wireless communication. In an example implementation, remote resources 112 may be a cloud computing solution including a plurality of computing devices (e.g., servers) accessible through a wide area network (WAN) such as the Internet. When device 102 is not coupled to operational environments 106A . . . n, it may interact with remote resources 112 via wireless communication. During this interaction, device 102 may process data related to the certain functionality of a particular operational environment 106A . . . n. For example, given the above example of home operational environment 106A, device 102 may download TV-related content from remote resources 112 related to the previous coupling between devices 102 and 108A.

Figure 2:
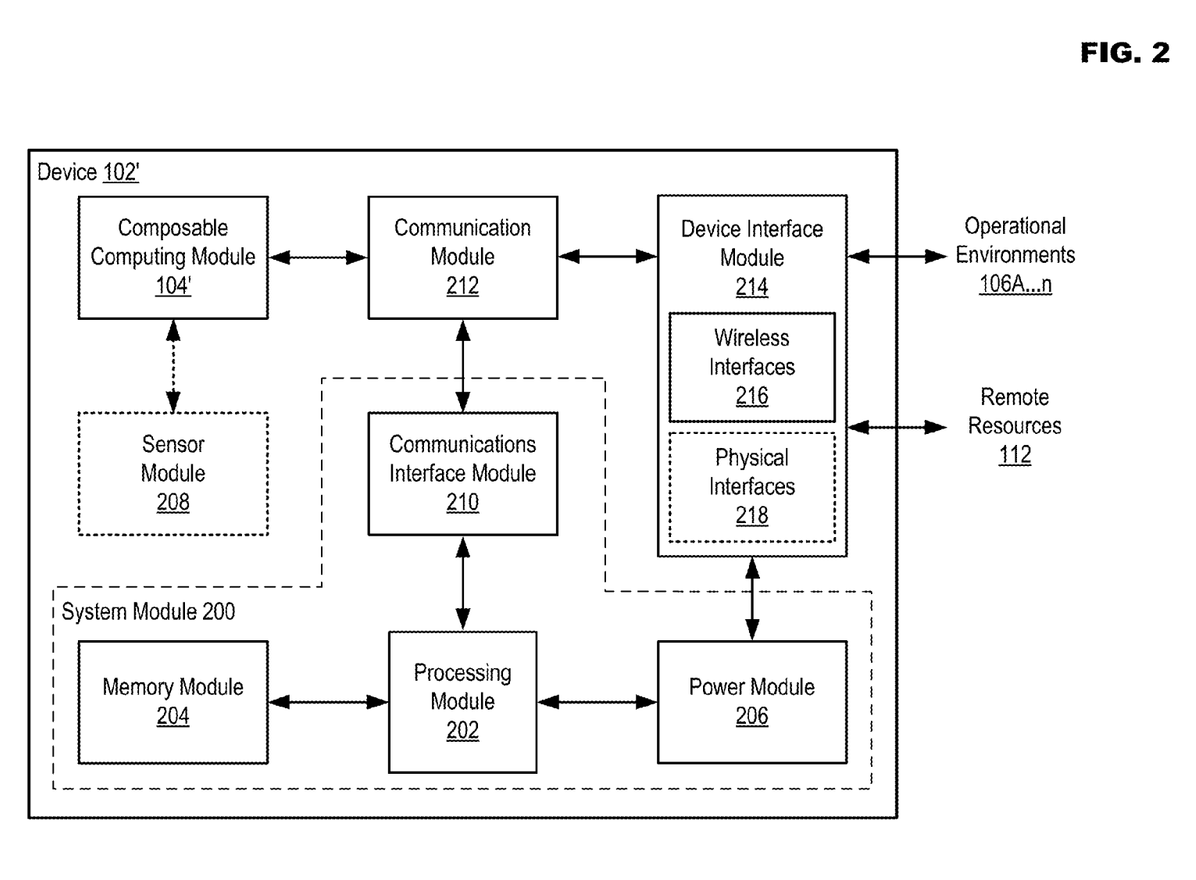
FIG. 2 illustrates an example configuration for a composable thin computing device in accordance with at least one embodiment of the present disclosure.

FIG. 2 illustrates an example configuration for a composable thin computing device in accordance with at least one embodiment of the present disclosure. In particular, while device 102' may perform example functionality such as disclosed in FIG. 1, device 102' is meant only as an example of equipment that may be used in accordance with embodiments consistent with the present disclosure, and is not meant to limit these various embodiments to any particular manner of implementation.

Device 102' may comprise system module 200 configured to manage device operations. System module 200 may include, for example, processing module 202, memory module 204, power module 206 and communication interface module 210. Device 102' may further comprise composable computing module 104', communication module 212 and device interface module 214. While composable computing module 104', communication module 212 and device interface module 214 have been illustrated as separate from system module 200, this is merely for the sake of explanation herein. Some or all of the functionality associated with composable computing module 104', communication module 212, and/or device interface module 214 may also be incorporated within system module 200. Moreover, while the following disclosure may describe the example composition of the modules in device 102' using a variety of components, embodiments consistent with the present disclosure may comprise multiple modules that include similar components incorporated within the same System-on-a-Chip (SoC), Multichip Module (MCM), etc. The incorporation of multiple modules into the same integrated circuit (IC) allows device 102' to be very small, which may make device 102' easy to carry and readily accessible.

In device 102', processing module 202 may comprise one or more processors situated in separate components, or alternatively, may comprise one or more processing cores embodied in a single component (e.g., SoC configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as a microprocessor (e.g., in an SoC package like the Sandy Bridge integrated circuit available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include memory configured to hold information during the operation of device 102' such as, for example, static RAM (SRAM) or Dynamic RAM (DRAM). ROM may include memories such as bios memory configured to provide instructions when device 102' activates in the form of bios, Unified Extensible Firmware Interface (UEFI), etc., programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc.

Power module 206 may include internal power sources (e.g., a battery) and/or external power sources (e.g., electromechanical or solar generator, power grid, fuel cell, etc.), and related circuitry configured to supply device 102' with the power needed to operate. Sensor module 208 may be optional in that device 102' may not include sensor module 208 based on design and/or resource limitations (e.g., limited space, processing capacity, power, etc.). Sensor module 208 may comprise at least one sensor, along with any necessary equipment or software, to sense conditions (e.g., to generate sensor data) related to device 102', to a user of device 102', to the environment surrounding device 102', etc. Example device conditions may include location, orientation, movement (e.g., speed, acceleration, etc.), temperature, power level, etc. Example user conditions may include identity, location, orientation, movement, etc. Environmental conditions may include light/dark sensing, temperature, other proximate wireless signals, etc.

Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, wireless local area networking (WLAN), Wi-Fi, etc.) and long range wireless mediums (e.g., cellular wide area radio communication technology, satellite technology, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. Device interface module 214 may comprise, for example, wireless interfaces 216 and physical interfaces 218. Wireless interfaces 216 may allow device 102' to interact with operational environments 106A . . . n and remote resources 112 via close-proximity, short-range or long-range wireless communication. Physical interfaces 216 may be optional in that it is possible for some devices 102' to rely solely on wireless communication. Physical interfaces 216 may include at least physical connectors for coupling device 102' to operational environments 106A . . . n. In one embodiment, device 102' may comprise a plurality of physical connectors, such as a USB connector and an HDMI connector. When physical connector(s) are used, the size of device 102' may not substantially exceed the size of the physical connector(s).

In the embodiment shown in FIG. 2, composable computing module 104' may interact with at least sensor module 208 and communication module 212. For example, composable computing module 104' may cause communication module 212 to send and/or receive data to operational environment 106A . . . n or remote resources 112 (e.g., via device interface module 214). Composable computing module 104' may also receive sensor data from sensor module 208 (e.g., for use in controlling the interaction between device 102' and remote resources 112). In one embodiment, power module 206 may also interact with device interface module 214 to, for example, charge at least one battery on power module 206. Power module 206 may receive power from wireless interfaces 216 (e.g., via a wireless signal that induces charging current in a coil in device 102') or from physical interfaces 218 (e.g., via a physical connection to operational environments 106A . . . n that provides charging current through a USB, HDMI, etc. connector).

Figure 3:
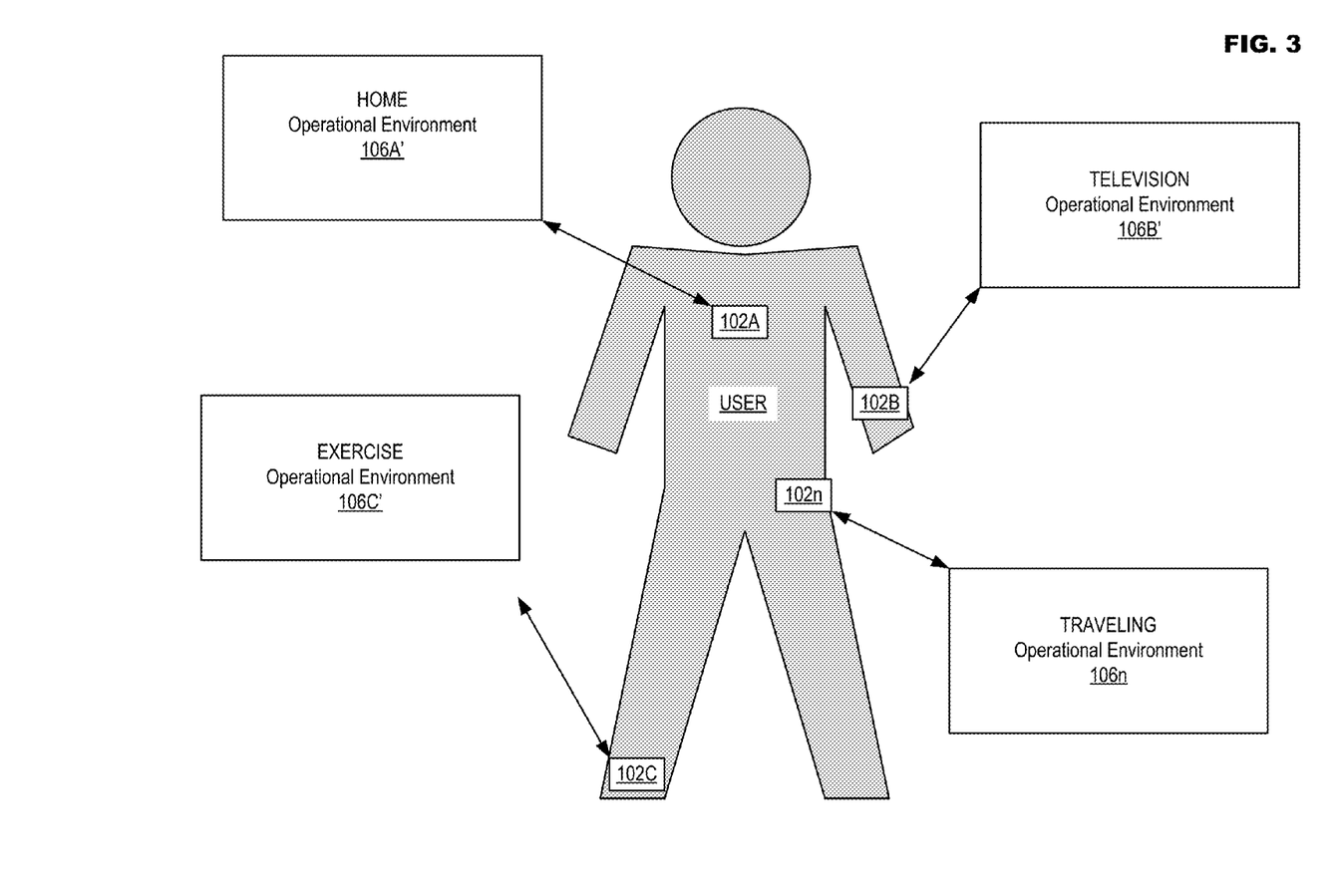
FIG. 3 illustrates example applications for a composable thin computing device in accordance with at least one embodiment of the present disclosure.

FIG. 3 illustrates example applications for a composable thin computing device in accordance with at least one embodiment of the present disclosure. The example implementation disclosed in FIG. 3 demonstrates how, consistent with embodiments of the present disclosure, a plurality of devices 102A, 102B, 102C . . . 102*n* (collectively, 102A . . . n) may be employed by a user to access certain functionality in various operational environments 106A . . . n'. Devices 102A . . . n may be carried, worn or even implanted in the user. For example, device 102A may from outward appearances be a piece of jewelry such as a necklace or broach, device 102B may be worn on the wrist as a wristwatch or bracelet, device 102C may be worn on the ankle or may be incorporated in footwear, while device 102n may worn on the belt, carried in a pocket, etc.

Each device 102A . . . n may couple to a different operational environment 106A . . . n'. For example, each device 102A . . . n may be the same (e.g., may have blank or default programming) until coupled to operational environments 106A . . . n' for the first time. Taking device 102A as an example, the first time coupling may cause devices 102A to become customized to operate with the operational environment 106A'. Coupling to device 102A to other operational environments 106A . . . n' (e.g., operational environment 106B') may cause device 102A to prompt a user (e.g., via user interface modules 110B) as to whether the operation of device 102A should be changed to operate with operational environment 106B'. Alternatively, a user may customize operation of device 102A using any computing device to which device 102A may couple. Customization may involve device 102A causing a user interface to appear on the coupled computing device so that the user may select options for operating in a particular operational environment 106A . . . n' from the user interface, may load applications for interacting with an operational environment 106A . . . n', may load content for presentation within operational environment 106A . . . n', etc.

Each of operational environments 106A . . . n' may correspond to a different interest or situation in which the user may desire certain functionality. For example, home operational environment 106A' may include a device 108A such as a desktop computer to which device 102A may couple. Coupling the device to the desktop computer may cause a user interface to appear (e.g., via user interface module 110A) that includes home-related items such as to-do lists, grocery shopping lists, recipes, bills that need to be paid, the numbers of people that the user frequently calls from home, etc. When not connected to home operational environment 106A', device 102A may access remote resources 112 to upload the status of tasks, download new recipes, new bills, etc. Television operational environment 106B' may include a device 108B such as a TV monitor that, upon coupling with device 102B, may present a user interface listing content stored on device 102B for playback. In one embodiment, at least some of the content stored on device 102B may have been obtained from remote resources 112 via wireless communication while device 102B is not coupled to television operational environment 106B'. Exercise operational environment 106C' may include a device 108C such as exercise equipment that is loaded with a particular workout program and/or preferred workout music/video when coupled with device 102C. After the user has completed her workout and decouples device 102C from exercise environment 106C', device 102C may then interact with remote resources 112 to report the workout (e.g., workout settings, time, performance). The workout information reported to remote resources 112 may then be accessible to the user or another person (e.g., a physical trainer) to, for example, evaluate workout performance, set further workout goals, etc. In a final example, device 102n may be coupled with traveling operational environment 106n'. For example, device 102n may be coupled to device 108n (e.g., electronics in a vehicle such as a bicycle, motorcycle, automobile, bus, train, airplane, ship, etc.), which may cause a user interface to be presented (e.g., via user interface 110n) regarding navigation and/or routing, landmark information, travel advisories, stored audio, video or gaming content, etc. When not connected to traveling operational environment 106n', device 102n may store the location of the user and report it to remote resources 112 for safety reasons (e.g., user traceability), social media updates, etc. It is important to note that devices 102A . . . n and operational environments 106A . . . n' are merely examples, and other configurations consistent with the present disclosure are possible.

There are various advantages to devices 102A . . . n. For example, devices 102A . . . n may be portable to a degree that a user is not even aware they are being transported. The device may interact with operational environments 106A . . . n' to provide certain functionality that is desirable to the user. This functionality may be presented via user interfaces in operational environments 106A . . . n', which allows for easy user operation and also makes it possible for the device to be very compact and efficient (e.g., because the user interface requirements have been offloaded to operational environments 106A . . . n'). Moreover, devices 102A . . . n may comprise offline power (e.g., at least one battery). Thus, even when devices 102A . . . n are not coupled to operational environments 106A . . . n', online presence may be persistently updated. For example, information may be uploaded to remote resources 112 as it is generated and downloaded to devices 102A . . . n for later consumption (e.g., whenever the user encounters operational environments 106A . . . n').

Figure 4:
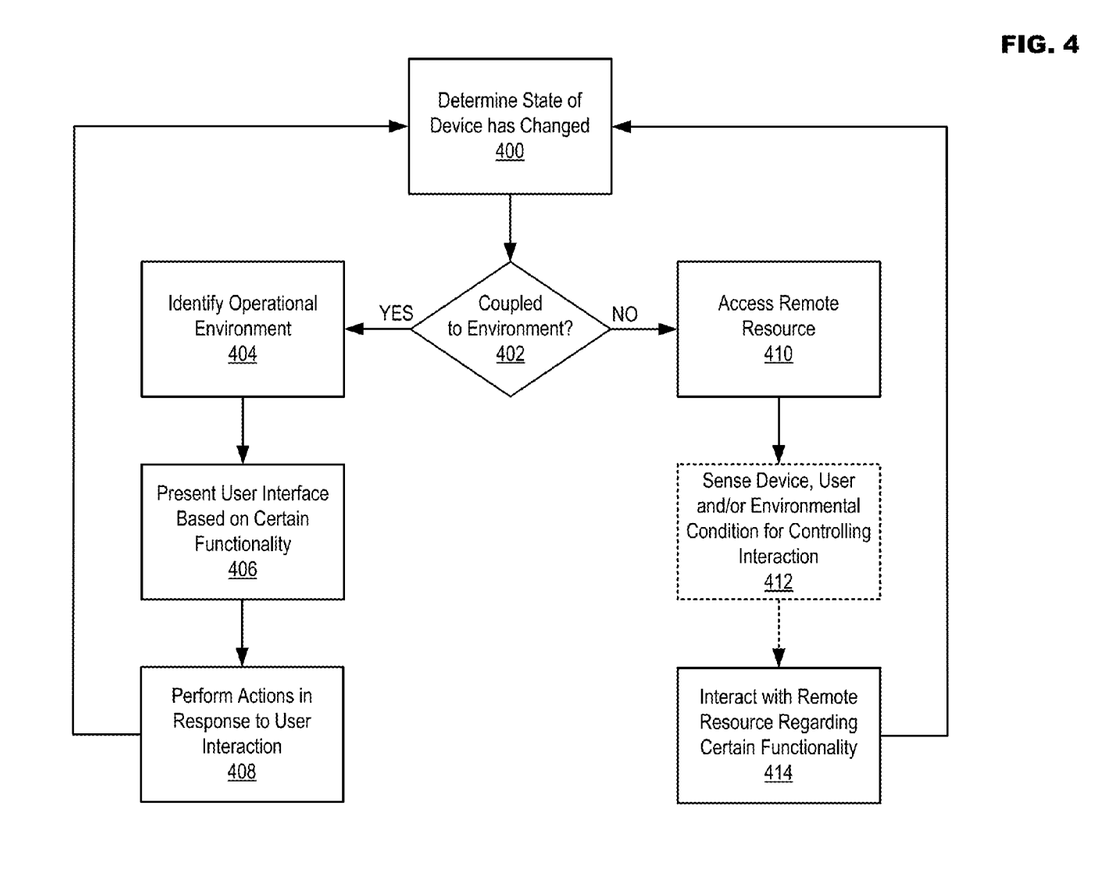
FIG. 4 illustrates example operations for a composable thin computing device in accordance with at least one embodiment of the present disclosure.

FIG. 4 illustrates example operations for a composable thin computing device in accordance with at least one embodiment of the present disclosure. A determination may be made in operation 400 that the state of a device has changed. State changes may comprise, for example, various events occurring in a device such as communication resources being engaged or disengaged manually by a user of the device, automatically by the device as the device enters into/departs from communication range of the operational environment, experiences interference during interaction with the operational environment, etc., automatically by the device based on device condition (e.g., application activation, processing and/or communication loading, power level, etc.), configuration changes made by the user (e.g., via the operational environment), etc. The above example state changes may result in the device being coupled to, or decoupled from, an operational environment as determined in operation 402. If in operation 402 it is determined that the device has been coupled to an operational environment, then in operation 404 the operational environment may be identified by the device. For example, a device in the operational environment may provide identification information to the device. Following identification of the operational environment, in operation 406 a user interface may be presented based on certain functionality to be performed related to the operational environment. For example, the device may cause the user interface to be presented by a user interface module in the operational environment. The user of the device may then interact with the user interface in the operational environment, causing actions to be performed related to the certain functionality in operation 408. Operation 408 may be followed by a return to operation 400 to prepare for determining the next device state change.

If in operation 402 it is determined that the device is not coupled to an operational environment, then in operation 410 remote resources may be accessed. The remote resources may be accessed wirelessly by, for example, long range wireless communication to a WAN like the Internet, via short-range wireless communication to an access point (AP) that is connected to the Internet, via close-proximity wireless communication to an AP, etc. Optionally (e.g., based on if the device includes a sensor module), in operation 412 device, user and/or environmental conditions may be sensed, and the sensed conditions may be used to control device interaction with the remote resources as carried out in operation 414. For example, sensing that the device is low on power may limit the amount of interaction with the remote resources in operation 414. Sensing that a device is stationary may cause the device to sleep, sensing device movement may cause certain functionality to occur such as, for example, location and/or distance logging to the remote resource for safety or exercise-based functionality, etc. In practice, sensor-based control may be based on the certain functionality, operational environment, etc. Operation 414 may be followed by a return to operation 400 to prepare for determining the next device state change.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a composable thin computing device. An example device may comprise at least a device interface module, a communication module, a processing module, a memory module, a composable computing module and a power module. The device interface module may couple the device to an operational environment via at least one of a physical connector or a wireless connection. The communication module may at least one of transmit or receive data via the device interface module. The processing module may process the data. The memory module may store at least a portion of the data. The composable computing module may cause at least one of the above modules to perform certain functionality related to the operational environment. The power module may power at least one of the above modules.

The following examples pertain to further embodiments. The following examples of the present disclosure may comprise subject material such as a composable thin computing device, a method, at least one machine-readable medium for storing instructions that when executed cause a machine to perform acts based on the method, means for performing acts based on the method and/or a system, as provided below.

Example 1

According to this example there is provided a device. The device may include a device interface module to couple the device to an operational environment via at least one of a physical connector or a wireless connection, a communication module to at least one of transmit or receive data via the device interface module, a processing module to process the data, a memory module to store at least a portion of the data, a composable computing module to cause at least one of the communication module, the processing module or the memory module to perform certain functionality related to the operational environment and a power module to power at least one of the communication module, processing module, memory module, composable computing module or device interface module.

Example 2

This example includes the elements of example 1, wherein the operational environment is a predetermined situation to provide cooperative computing functionality with the device.

Example 3

This example includes the elements of any of examples 1 to 2, wherein the size of the device in entirety does not substantially exceed the size of the physical connector.

Example 4

This example includes the elements of any of examples 1 to 3, wherein the size of the device in entirety is the size of the physical connector.

Example 5

This example includes the elements of any of examples 1 to 4, wherein the power module is further to utilize the device interface module to recharge at least one battery in the power module.

Example 6

This example includes the elements of example 5, wherein the at least one battery is recharged via at least one of current received via the physical connector or wireless charging signals received by circuitry coupled to the at least one battery.

Example 7

This example includes the elements of any of examples 1 to 6, wherein the composable computing module is further to identify the operational environment to which the device is coupled.

Example 8

This example includes the elements of example 7, wherein the device interface module is to couple the device to more than one operational environment, the composable computing module being further to identify each of the plurality of operational environments to which the device is coupled.

Example 9

This example includes the elements of any of examples 7 to 8, wherein the composable computing module is further to determine the certain functionality based on the identification of the operational environment.

Example 10

This example includes the elements of example 9, wherein the operational environment comprises at least one other device including a user interface module to allow for user interaction with the other device.

Example 11

This example includes the elements of example 10, wherein the composable computing module is further to cause a user interface based on the certain functionality to be presented by the user interface module.

Example 12

This example includes the elements of example 11, wherein the composable computing module is further to cause actions related to the certain functionality to be performed based on the user interaction.

Example 13

This example includes the elements of any of examples 1 to 12, wherein the composable computing module is further to determine when the device is not coupled to the operational environment.

Example 14

This example includes the elements of example 13, wherein the composable computing module is further to cause the device to wirelessly couple to a remote resource via the device interface module when it is determined that the device is not coupled to the operational environment.

Example 15

This example includes the elements of example 14, wherein the composable computing module is further to cause interaction between the device and the remote resource related to the certain functionality.

Example 16

This example includes the elements of example 15, further comprising at least one sensor to provide sensor data to the composable computing module for controlling the interaction with the remote resource.

Example 17

This example includes the elements of example 16, wherein the at least one sensor is to sense at least one of user condition, device condition or environmental condition.

Example 18

This example includes the elements of any of examples 16 to 17, wherein the composable computing module is further to initiate, increase, decrease or terminate the interaction based on the sensor data.

Example 19

This example includes the elements of any of examples 1 to 18, wherein the device may be worn by a user of the device.

Example 20

This example includes the elements of any of examples 1 to 19, wherein the composable computing module is further to identify the operational environment to which the device is coupled and determine the certain functionality based on the identification of the operational environment.

Example 21

This example includes the elements of any of examples 1 to 20, wherein the composable computing module is further to determine when the device is not coupled to the operational environment, cause the device to wirelessly couple to a remote resource via the device interface module when it is determined that the device is not coupled to the operational environment and cause interaction between the device and the remote resource related to the certain functionality.

Example 22

According to this example there is provided a method. The method may include determining a state change in a device, determining based on the state change if the device is coupled to an operational environment, if it is determined that the device is coupled to the operational environment, identifying the operational environment and causing a user interface based on certain functionality related to the operational environment to be presented by the operational environment, and if it is determined that the device is not coupled to the operational environment, causing the device to interact with a remote resource.

Example 23

This example includes the elements of example 22, and further comprises causing at least one battery in the device to charge if it is determined that the device is coupled to the operational environment.

Example 24

This example includes the elements of any of examples 22 to 23, wherein if the device is coupled to more than one operational environment, identifying each of the operational environments to which the device is coupled.

Example 25

This example includes the elements of any of examples 22 to 24, and further comprises performing actions related to the certain functionality based on user interaction with the user interface.

Example 26

This example includes the elements of any of examples 22 to 25, wherein the interaction with the remote resource is related to the certain functionality.

Example 27

This example includes the elements of any of examples 22 to 26, and further comprises controlling the interaction with the remote resource based on device sensor input.

Example 28

This example includes the elements of example 27, wherein controlling the interaction comprises initiating, increasing, decreasing or terminating the interaction based on the sensor data.

Example 29

According to this example there is provided a system including at least a device, the system being arranged to perform the method of any of the above examples 22 to 28.

Example 30

According to this example there is provided a chip set arranged to perform the method of any of the above examples 22 to 28.

Example 31

According to this example there is provided at least one machine readable medium comprising a plurality of instructions that, in response to be being executed on a computing device, cause the computing device to carry out the method according to any of the above examples 22 to 28.

Example 32

According to this example there is provided a device configured as a composable thin computing device, the device being arranged to perform the method of any of the above examples 22 to 28.

Example 33

According to this example there is provided at least one device having means to perform the method of any of the above examples 22 to 28.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A method, comprising:
    determining a connection status of a displayless device having at least a processor and memory;
    determining based on the connection status whether the displayless device is coupled to an operational environment, the operational environment including at least one computing device and a display;
    when it is determined that the displayless device is coupled to the operational environment:
        identifying, from a plurality of location identifiers, an identifier associated the coupled operational environment;
        identifying content stored in a memory of the displayless device that is associated with the identifier of the coupled operational environment; and
        causing the display to present a user interface based on the coupled operational environment, the user interface showing at least a portion of the identified content associated with the coupled operational environment; and
    when it is determined that the displayless device is not coupled to the operational environment, causing the displayless device to interact with a remote resource.
2. The method of claim 1, further comprising:
    causing at least one battery in the displayless device to charge if it is determined that the displayless device is coupled to the operational environment.
3. The method of claim 1, further comprising:
    controlling the interaction with the remote resource based on displayless device sensor input.

4. The method of claim 1, wherein the content includes at least one of music content, video content, text-based content, or a listing thereof for user selection purposes.

5. The method of claim 1, wherein the operational environment is a physical space.

6. At least one non-transitory machine-readable storage medium having stored thereon, individually or in combination, instructions that when executed by one or more processors result in the following operations comprising:
    determining a connection status of a displayless device having at least a processor and memory;
    determining based on the connection status whether the displayless device is coupled to an operational environment, the operational environment including at least one computing device and a display;
    when it is determined that the displayless device is coupled to the operational environment:
        identifying, from a plurality of location identifiers, an identifier associated the coupled operational environment;
        identifying content stored in a memory of the displayless device that is associated with the identifier of the coupled operational environment; and
        causing the display to present a user interface based on the coupled operational environment, the user interface showing at least a portion of the identified content associated with the coupled operational environment; and
    when it is determined that the displayless device is not coupled to the operational environment, causing the displayless device to interact with a remote resource.

7. The medium of claim 6, further comprising instructions that when executed by one or more processors result in the following operations comprising:
    causing at least one battery in the displayless device to charge if it is determined that the displayless device is coupled to the operational environment.

8. The medium of claim 6, further comprising instructions that when executed by one or more processors result in the following operations comprising:
    controlling the interaction with the remote resource based on displayless device sensor input.

9. The medium of claim 6, wherein the content includes at least one of music content, video content, text-based content, or a listing thereof for user selection purposes.

10. The medium of claim 6, wherein the operational environment is a physical space.

* * * * *